United States Patent Office 3,300,445
Patented Jan. 24, 1967

3,300,445
COPOLYMERS OF FORMALDEHYDE AND
s-TRITHIANES
Henri Sidi, Paramus, N.J., assignor, by mesne assignments,
to Tenneco Chemicals, Inc., a corporation of Delaware
No Drawing. Filed July 9, 1963, Ser. No. 293,844
2 Claims. (Cl. 260—67)

This application is a continuation-in-part of my copending application Serial No. 133,783, filed August 25, 1961, now United States Letters Patent No. 3,219,630, entitled, "Production of Branched Chain Polyoxymethylene Polycarboxylates."

This invention relates to formaldehyde copolymers and, more particularly, to a new class of high molecular weight copolymers of formaldehyde and s-trithianes, as well as to the process by which these copolymers are prepared. These new copolymers may be fabricated into films, filaments, fibers, rods and tubes.

The new class of copolymers has been prepared by copolymerizing formaldehyde with an s-trithiane under substantially anhydrous conditions. Structurally, these new copolymers contain from about 50 to about 99.9 percent by weight of recurring oxymethylene (—OCH$_2$—) groups and from about 50 to about 0.1 percent by weight of recurring thiomethylene (and substituted thiomethylene) groups derived from the s-trithiane.

The new copolymers of the invention may conveniently be prepared by contacting monomeric formaldehyde with an s-trithiane in a liquid alkylene dicarboxylate reaction medium preferably in the presence of a formaldehyde polymerization initiator, at a temperature in the range between about 0° C. to about 80° C., and preferably in the range between 10° C. to 40° C., under substantially anhydrous conditions. The monomeric formaldehyde used in the preparation of these copolymers may be derived from the pyrolysis of paraformaldehyde, trioxane, α-polyoxymethylene, or a hemiformal, such as cyclohexanol hemiformal. To obtain polymer products having the desired properties, the monomeric formaldehyde should be substantially anhydrous, that is, contain less than 0.5 percent and preferably less than 0.1 percent by weight of water.

The s-trithianes which are used to prepare the new copolymers of the invention may be represented by the structural formula

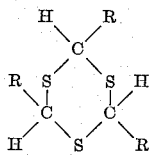

in which each R represents a monovalent radical individually selected from the group consisting of hydrogen, alkyl groups containing from 1 to 4 carbon atoms, phenyl, alkylphenyl, alkoxyphenyl, aminophenyl, nitrophenyl, halophenyl, and hydroxyphenyl groups. Illustrative of these s-trithianes are trithiane (trithioformaldehyde), trithioacetaldehyde, trithiobutyraldehyde, trithiobenzaldehyde, trithioanisaldehyde, trithio-p-dimethylaminobenzaldehyde, trithio-p-nitrobenzaldehyde, and trithiosalicylaldehyde. These s-trithianes may be prepared, for example, by the reaction of the appropriate aldehyde with sodium thiosulfate in the presence of an acidic catalyst.

The copolymerization of formaldehyde, and the s-trithiane can be effected in the presence or in the absence of a formaldehyde polymerization initiator which functions to catalyze the copolymerization reaction. When used, the formaldehyde polymerization initiator is generally employed in an amount in the range from about 0.00001 to about 0.05 part, and preferably 0.0001 to 0.005 part by weight per part by weight of monomeric formaldehyde. Any of the well-known formaldehyde polymerization initiators can be used in this process including aliphatic amines, hydroxypolyamines, phosphines, arsines, stilbenes, organometallic compounds, and boron trifluoride compounds. Excellent results have been obtained using as the initiator a boron trifluoride coordinate complex with an organic compound in which oxygen or sulfur is the donor atom. The coordinate complex of boron trifluoride may be, for example, a complex with an alcohol, a phenol, an acid, an ether, an acid anhydride, an ester, a ketone, an aldehyde, a dialkyl sulfide, or a mercaptan. Particularly useful as initiators are boron trifluoride etherates, such as boron trifluoride diethyl etherate and boron trifluoride di-n-butyl etherate. Another preferred group of formaldehyde polymerization initiators are chelates of such polyvalent metals as copper, iron, zinc, and zirconium. The chelating agents that may be used include 8-hydroxyquinoline, malonic acid, citraconic acid, N,N-dialkylethylene diamines, o-phenanthraline, phenylamine, ethylenediamine tetracetic acid, salicylaldehyde, benzoin oxime, dimethylglyoxime, and particularly acetylacetone and similar β-diketones, the use of which latter chelates are described in the copending application of Richard E. Reynolds, Serial No. 293,843, filed July 9, 1963.

The copolymerization is carried out in an alkylene dicarboxylate reaction medium which remains liquid under the polymerization conditions employed. Suitable alkyline dicarboxylate reaction media include methylene diacetate and methylene dipropionate, the use of which is described in my copending application Serial No. 133,-783, now United States Letters Patent No. 3,219,630. As a general rule, the amount of the reaction medium used is in the range of 1 part to 1000 parts and in most cases 1 part to 100 parts by weight per part by weight of the comonomers.

The copolymerization of the formaldehyde and s-trithiane may be carried out in any convenient manner. For example, anhydrous monomeric formaldehyde may be introduced into a reactor containing the s-trithiane, the reaction medium, and the polymerization initiator. Alternatively, the polymerization initiator may be added to a mixture of formaldehyde and the s-trithiane in the reaction medium. The copolymerization process of the present invention may be carried out as a batchwise process or as a continuous process.

The anhydrous monomeric formaldehyde is ordinarily introduced into the reactor through a gas inlet tube opening above the surface of the reaction medium so as to avoid plugging due to the formation of polymer within the tube. The reaction mixture is stirred vigorously throughout the addition of the reactants and the polymerization step.

The formation of the copolymers is best effected under non-oxidizing conditions. A convenient way of obtaining such conditions involves sweeping the reactor with a dry inert gas, such as nitrogen, and carrying out the copolymerization under a blanket of the inert gas. In addition an antioxidant may be present during the reaction and/or may be added to the product to reduce oxidative effects. Among the antioxidants that are useful for this purpose are phenothiazine, 2-mercaptobenzimidazole, diphenylamine, phenyl-α-naphthylamine, bis-(β-naphthylamino) - p - phenylenediamine, 4,4'-butylene bis - (3 - methyl - 6 - t-butylphenol), and 5-ethyl-10,10-diphenylphenazasiline. The amount of antioxidant used is approximately 0.01 percent to 1 percent base on the weight of the comonomers.

To prevent degradation of the copolymer resulting from prolonged contact with the polymerization initiator, it is generally desirable to remove or neutralize the initiator upon completion of the polymerization step. When a boron trifluoride coordinate complex is used as the initiator, the reaction mixture can be treated with an alkaline material, for example, an aliphatic amine or an alkali metal salt of an alkanoic acid containing from 1 to 18 carbon atoms, to neutralize the initiator. Other initiators can be removed by washing the reaction mixture with water or a suitable organic solvent.

A preferred process according to the invention for producing normally solid copolymers containing approximately 50 percent to 99.9 percent by weight of recurring oxymethylene groups and 0.1 percent to 50 percent by weight of recurring

groups, in which R represents a monovalent radical selected from the group consisting of hydrogen, alkyl groups containing from 1 to 4 carbon atoms, phenyl, alkylphenyl, alkoxyphenyl, aminophenyl, nitrophenyl, halophenyl, and hydroxyphenyl groups, comprises contacting substantially anhydrous monomeric formaldehyde with an s-trithiane having the structural formula

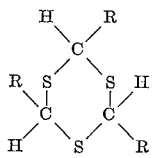

in which each R represents one of the radicals hereinbefore defined, in the presence of a formaldehyde polymerization initiator and a liquid reaction medium at a temperature in the range of approximately 0° C. to 80° C. under substantially anhydrous conditions.

Because improved thermal stability of the copolymer may be obtained by "capping" the terminal hydroxyl or mercapto groups of the copolymer molecules, it is frequently desirable (though not essential) to chemically stabilize the resultant copolymer by acylation, etherification, cyanoethylation, or other such procedures. By way of illustration, the copolymers can be acylated by heating them with a methylene dicarboxylate, such as methylene diacetate, in the presence of an alkaline esterification catalyst, such as sodium acetate.

The following examples are illustrative of the ease with which formaldehyde may be copolymerized with an s-trithiane to prepare the new copolymers of the invention:

*Example I*

Anhydrous monomeric formaldehyde was prepared by heating a suspension of 100 grams of α-polyoxymethylene in 400 ml. of mineral oil at 117°–150° C. The formaldehyde vapors from this pyrolysis were passed through a series of traps, the first of which was maintained at room temperature, the second at 0° C., and the third and fourth at −15° C. to −22.5° C. The resulting purified anhydrous monomeric formaldehyde was introduced along with a stream of anhydrous nitrogen into a reactor that contained 565 grams of freshly-distilled methylene diacetate, 10 grams of trithiane, 0.3 ml. of boron trifluoride di-n-butyl etherate, and 0.1 gram of 4,4′-butylene-bis-(3-methyl-6-t-butylphenol). The reaction mixture was stirred vigorously and maintained at a temperature in the range of 25° C. to 30° C. during the addition of the formaldehyde which took place over a period of one hour. The copolymer was separated from the reaction mixture by filtration, washed with 500 ml. of acetone, with four 500 ml. portions of water, and finally with two 500 ml. portions of acetone, the second of which contained 0.1 gram of 4,4′ - butylene - bis - (3-methyl-6-t-butylphenol). The formaldehyde-trithiane copolymer, after drying under vacuum at 65° C., contained 13.23 percent by weight of sulfur, which indicated that it contained 19 percent by weight of thiomethylene (—SCH$_2$—) groups.

*Example II*

Anhydrous monomeric formaldehyde was prepared by heating a suspension of 100 grams of α-polyoxymethylene in 400 ml. of mineral oil at 117°–150° C. The formaldehyde vapors from this pyrolysis were passed through the series of traps described in Example I and then along with a stream of anhydrous nitrogen into a reactor that contained 589 grams of freshly-distilled methylene diacetate, 10 grams of trithiane, 0.1 gram of copper 8-quinolinolate, and 0.1 gram of 4,4′-butylene-bis-(3-methyl-6-t-butylphenol). The reaction mixture was stirred vigorously and maintained at a temperature in the range of 25° C. to 30° C. during the addition of the formaldehyde which took place over a period of one hour. After the addition of 0.5 gram of anhydrous sodium acetate, the reaction mixture was heated gradually to 160° C., maintained at a temperature in the range of 160° C. to 165° C. for one hour, cooled slowly to room temperature, and filtered. The resulting acetylated copolymer was washed and dried by the procedure described in Example I, yielding 3.15 grams of an acetylated formaldehyde-trithiane copolymer.

Although the foregoing examples illustrate the preparation of copolymers of formaldehyde and trithiane, similar copolymers may be prepared by using other substituted s-trithianes in the process of the invention.

I claim:

1. A normally solid, high molecular weight copolymer of formaldehyde and an s-trithiane comprising the acylated polymerization product formed by (a) contacting substantially anhydrous monomer formaldehyde and from about 0.1 to about 50 percent by weight, based on the weight of the formaldehyde which undergoes reaction, of an s-trithiane having the structural formula

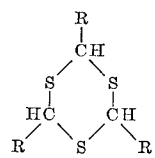

in which each R represents a monovalent radical selected from the group consisting of hydrogen, alkyl groups containing from 1 to 4 carbon atoms, phenyl, alkylphenyl, alkoxyphenyl, aminophenyl, nitrophenyl, halophenyl, and hydroxyphenyl groups, with a polymerization initiator in the presence of an alkylene dicarboxylate at a temperature in the range from about 0° C. to about 80° C. under substantially anhydrous conditions, and (b) heating the polymerization product until all of its terminal groups are substantially completely acylated.

2. A normally solid, high molecular weight copolymer of formaldehyde and s-trithiane comprising the acetylated polymerization product formed by (a) contacting substantially anhydrous monomeric formaldehyde and from about 0.1 to about 50 percent by weight of s-trithiane, based upon the weight of the formaldehyde which undergoes reaction, with a polymerization initiator in the presence of methylene diacetate at a temperature in the range from about 0° C. to about 80° C. under substantially anhydrous conditions, and (b) heating the polymerization product in the presence of the methylene diacetate until all of its terminal groups are substantially completely acetylated.

References Cited by the Examiner

UNITED STATES PATENTS

| | | | |
|---|---|---|---|
| 2,385,661 | 9/1945 | Vaala et al. | 260—79 |
| 3,027,352 | 3/1962 | Walling et al. | 260—67 |
| 3,070,580 | 12/1962 | Harmon | 260—79 |
| 3,111,503 | 11/1963 | O'Connor et al. | 260—67 |

(Other references on following page)

FOREIGN PATENTS 1,365,087   5/1964   France.

OTHER REFERENCES

Walker: Formaldehyde, ACS Monograph Series, p. 192 (1953), QD 305 A6W3, 1953.

Schonfeld: Journal of Polymer Science, vol. 49, No. 152, pp. 277–282 (1961), QD 281 P6J62.

Kern et al.: Angewandte Chemie, vol. 73, No. 6. pp. 177–186 (March 1961), QD 1Z5.

Lal: Journal of Organic Chemistry, vol. 26, No. 3, pp. 971–972 (March 1961).

Gipstein et al.: Journal of Polymer Science, vol. 1, Pt. B, pp. 237–239 (1963), QD 281 P6J62.

WILLIAM H. SHORT, *Primary Examiner.*

L. M. MILLER, *Assistant Examiner.*